United States Patent [19]

Anscher et al.

[11] Patent Number: 4,566,660
[45] Date of Patent: Jan. 28, 1986

[54] CRADLE CLIP

[75] Inventors: Joseph Anscher, Farmingdale, N.Y.; Dale Smous, Coral Springs, Fla.

[73] Assignee: National Molding Corporation, Farmingdale, N.Y.

[21] Appl. No.: 459,595

[22] Filed: Jan. 20, 1983

[51] Int. Cl.[4] .............................................. F16L 3/08
[52] U.S. Cl. ................................ 248/74.2; 248/316.7; 24/453; 24/462; 24/545
[58] Field of Search ............... 248/74 A, 73, 68 R, 248/316 D, 71; 24/297, 296, 453, 459, 460, 462, 530, 545, 16 PB, 17 AP, 17 B

[56] References Cited

U.S. PATENT DOCUMENTS

| | | | |
|---|---|---|---|
| 2,166,916 | 7/1939 | Lombard | 248/73 |
| 2,909,957 | 10/1959 | Rapata | 248/73 |
| 3,441,986 | 5/1969 | Pritchard | 248/68 R |
| 3,444,596 | 5/1969 | Soltysik | 248/73 |
| 3,627,300 | 12/1971 | Caveney et al. | 248/68 R |
| 3,659,319 | 5/1972 | Erickson | 248/74 A |
| 4,023,758 | 5/1977 | Yuda | 248/73 |
| 4,131,258 | 12/1978 | Okuda et al. | 248/74 A |
| 4,295,618 | 10/1981 | Morota et al. | 248/68 R |

FOREIGN PATENT DOCUMENTS 2454012 12/1980 France .................. 248/73 A
2066887 7/1981 United Kingdom ............ 248/73 A

OTHER PUBLICATIONS

Western Electric Technical Digest–4/1978 (pp. 23 & 24).

Primary Examiner—Ramon S. Britts
Assistant Examiner—Ramon O. Ramirez
Attorney, Agent, or Firm—Kenyon & Kenyon

[57] ABSTRACT

A conduit restraining clip to snugly secure one or more axially aligned tubes, wires, lines, cords, hoses and the like, which may vary in bundle size, comprising a base with two side walls projecting generally vertically from its opposite edges and two pairs of spaced-apart arms projecting from the side walls into the interior of the clip and downwardly toward the base of the clip. The arms of the clip flex downwardly and laterally to enable the clip to receive conduits and the upper pair of arms and the lower pair of arms cooperate to cradle the clip's contents in suspended restraint. In one embodiment of the invention, the arms of the clip are equipped with overlapping projections which form an expandable central enclosure which is well suited for holding a plurality of small conduits. Clips according to the invention can be provided with affixing devices for securing the clip contents to another object.

14 Claims, 6 Drawing Figures

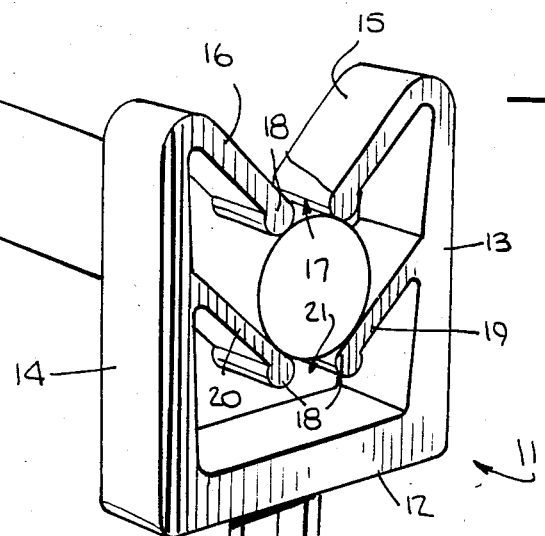
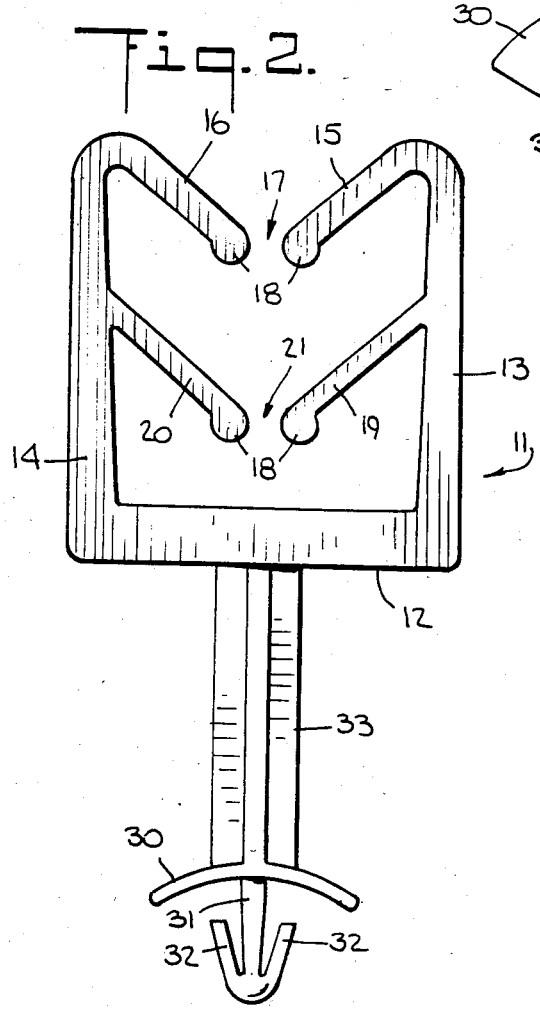
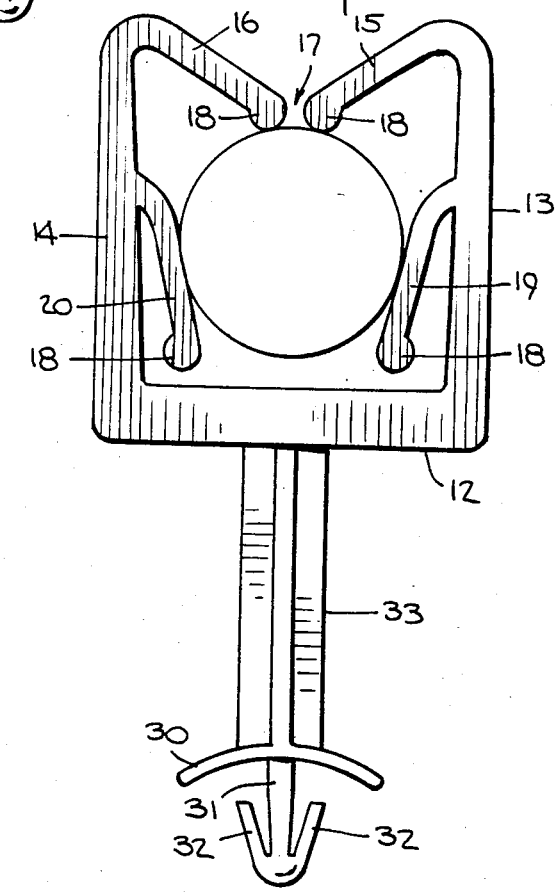

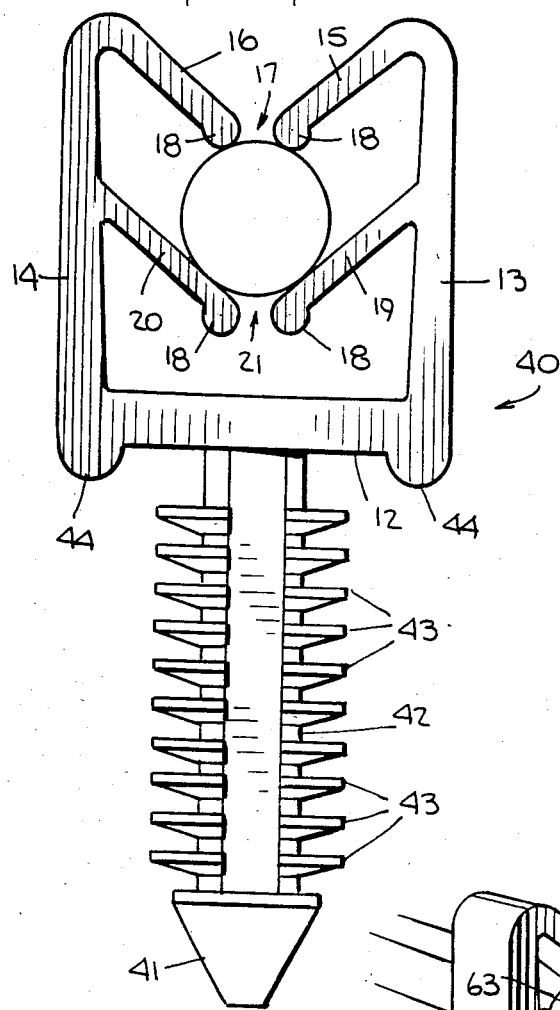
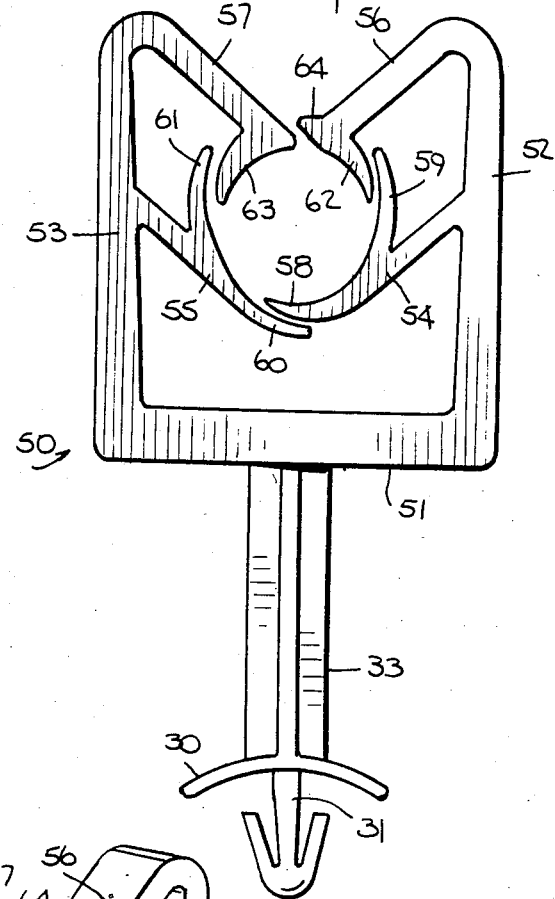
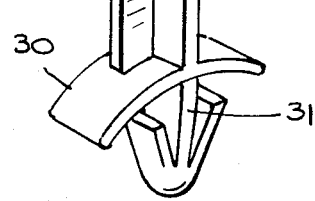

CRADLE CLIP

BACKGROUND TO INVENTION

This invention relates to clips of the type used to restrain axially aligned conduits such as tubes, cables, wires, lines, cords or the like; more particularly the invention relates to a cradle clip which can snugly hold conduits of a variety of sizes and which has the ability to resist releasing its contents if they are manipulated so as to put stress on the clip.

Conduit restraining clips have generally fallen into one of two groups, those which merely secure a number of conduits together in a bundle and those which secure one or more conduits which also incorporate a device for affixing the clip to another object. The present invention is directed to a conduit restraining clip which can be employed either to secure conduits together or in conjunction with an affixing device to hold the clip and its contents to a fixed position.

Conduit restraining clips have heretofore taken a large variety of different forms. Generally, the prior art devices have sought to solve the primary problem of particular applications but have failed to deal with secondary problems and considerations inherent in most applications. Illustrative of the foregoing is the use of flexible strap type restraining devices to attach hoses, cables and the like together and to panels in automobiles. The flexible strap type device is generally well suited to tightly binding a variety of bundle sizes so as to minimize movement and vibration, which is often the primary concern in automobile applications, but such devices are typically not easily released once closed around a conduit, thus making repairs and servicing that require removal or replacement of the conduit difficult. Another device which has been used to bunch and route wires, cables, tubes and the like consists of an enclosure defining open loop of resilient material which has a narrow mouth that is expanded to receive conduits intended for confinement within the loop. The loop resiliently returns to its natural narrow opening when released. Such devices are easy to load and unload but generally do not hold their contents snugly, thus permitting movement and vibration of conduits therein, unless the conduits are fortuituously of the same size and shape as the enclosure.

A conduit restraining device which is suitable for a wide variety of applications must satisfy a number of seemingly contradictory requirements. First, in order for a conduit restraining device to have maximum utility it must be capable of snugly holding a wide range of bundle sizes, so as to minimize the stock of such parts which must be carried by installers. A conduit restraining device should also be designed so as to enable the user to remove conduits therefrom without damaging either the conduits or the device, thus enabling servicing and repairs to system in which the device is employed. In recognition of the fact that, in the workplace, conduit restraining devices will often be inaccurately deployed to receive their intended contents, the preferred conduit restraining device should snugly hold its contents inspite of minor mispositioning during installation. Further, the application of pressure on the interior of the restraining device by the manipulation of conduits contained therein, during installation or servicing, should not readily cause such a device to release its contents.

Accordingly, it is an object of the present invention to provide an improved conduit restraining device which can snugly hold a variety of bundle sizes.

Another object of the present invention is to provide a conduit restraining device which can easily be made to release its contents without damage thereto or to the device.

Another object of the present invention is to provide a conduit restraining device which will function well inspite of minor mispositioning of the device.

A further object of the present invention is to provide a conduit restraining device which will not readily release its contents in response to pressure brought to bear on the interior of the device by the manipulation of its contents.

A further object of the present invention is to make a conduit restraining device which can be of an inexpensive, unitary, molded manufacture, utilizing widely available plastic materials such as nylon.

A still further object of the present invention is to make a restraining device which may be equipped with devices for affixing the device and its contents to securing objects.

SUMMARY OF THE INVENTION

To accomplish the objects of this invention a cradle clip is constructed of a flexible-resilient material having the general configuration of a squared-off "U" with two spaced-apart arms projecting diagonally from the interior surface of each of the "U" side walls toward the base of the "U", with each of the arms extending within the clip to lateral points slightly short of the centerline of the clip. The arms projecting from the opposite walls of the "U" do so at the same elevation from the base of the "U" and at the same acute angle to the side walls. The described cradle clip is loaded by pushing the axial cross-section of a properly sized conduit, such as a tube or a cable, into the small gap between the upper arms of the clip which is too small to receive the conduit, the conduit thus engages the adjacent upper arms and deflects them downwardly towards the base and laterally towards the side walls of the clip. As the conduit is pushed further into the clip it engages the lower arms and, in the same way as with the upper arms, deflects them downwardly and laterally. Once the broadest cross-section of the conduit is pushed to a point beyond the tips of the upper arms they resiliently return to their normal orientation with respect to the side walls and base, again leaving a gap therebetween which is too narrow to permit the passage of the conduit. When inserting pressure is removed from the conduit, the lower arms resiliently spring back toward their normal unstressed orientation and in doing so cradle the conduit between themselves and the upper arms.

Cradle clips according to the present invention can hold conduits having a broad range of cross-sections. At the small end of the scale a cradle clip according to the invention can snugly hold a conduit having an axial cross-section only slightly larger than the distance between the upper and lower arms at the center of the clip. At upper end of the scale, the cradle clip can hold conduits having cross-sections nearly equal to the distance between the side walls of the clip. When a conduit of relatively large cross-section is confined by a cradle clip according to the invention, the lower arms of the clip are deflected from their normal rest positions downwardly and towards the side walls of the clip and the upper arms of the clip are upwardly deflected from their unstressed position, with the conduit being held therebetween by the resilient tendency of both of the lower and the upper arms to return to their rest positions.

The aforedescribed embodiment of the invention is best suited for use with a single conduit. There is a modified embodiment of the invention which is better suited to confining a plurality of conduits. This modified embodiment of the invention has arcuate projections extending from each of its arms which interact so as to form a roughly circular enclosure at the center of the clip. The circular enclosure defined by the arcuate projections serves to confine a plurality of conduits in a central bundle. The modified cradle clip is loaded in the same way as the aforedescribed unmodifed version and the resilient action of the upper and lower arms during loading is the same as on the unmodified clip.

Where it is considered desirable to fasten cables, wires, hoses, tubes or the like to a particular location, cradle clips according to the present invention lend themselves to use with devices for affixing the clip and its contents to another object. Such affixing devices are well-known in the art, and any of them should be suitable for use with the present invention. Typical of these devices is one which can be attached to or integral with a part, consisting of a stem bearing resilient wing-like projections which are orientated on the stem so as to fold in against it while the stem is being inserted into a wall aperture and to expand behind the wall once fully inserted, thereby preventing removal Other affixing devices range from simple clips to adhesives.

Other objects, features and advantages of the invention will be apparent from the following detailed description taken in connection with the accompanying drawings.

BRIEF DESCRIPTION OF THE DRAWINGS

The invention, as well as its objects and features will be better understood by reference to the following detailed description of the preferred embodiment of this invention taken in conjunction with the accompanying drawings in which:

FIG. 1 is a perspective view of a cradle clip according to the invention holding a circular conduit.

FIG. 2 is a side plan view of the cradle clip of FIG. 1, without the contained conduit.

FIG. 3 is a side plan view of the cradle clip of FIG. 1 holding a conduit of larger cross-section.

FIG. 4 is a side plan view of a cradle clip according to the present invention holding a circular conduit having a push pin type mounting means.

FIG. 5 is a side plan view of an embodiment of the cradle clip according to the present invention which is adapted to snugly hold a plurality of conduits.

FIG. 6 is a perspective view of the cradle clip of FIG. 5 holding a bundle of circular conduits.

FIG. 7 is a perspective view of an embodiment of the cradle clip according to the present invention in which the upper arm pair is formed so as to lie in different axial planes.

FIG. 8 is a side plan view of the cradle clip of FIG. 7.

DETAILED DESCRIPTION OF THE INVENTION

Referring to the drawings wherein like parts are designated by the same number in all of the various figures, a cradle clip 11 incorporating the features of the present invention and adapted for standoff panel aperature mounting is shown in FIGS. 1-3 and cradle clip 40 which is identical to cradle clip 11 but for its incorporation of an alternate flush mounting means is shown in FIG. 4. Cradle clip 50 incorporating features of the present invention is an embodiment adapted to be particularly suited for holding multiple conduit bundles is shown in FIGS. 5-6. All of the embodiments of the invention may be constructed of any flexible resilient material such as, for example, nylon, acetal, polyester, polycarbonate, polyethylene, polypropylene, ABS, aluminum or steel. Preferably for most applications and from a point of view of cost, cradle clips of the present invention are made as unitary pieces by injection molding from plastic dielectric insulating materials, which for example, may be any of the plastics previously recited; the construction and operation of injection molds being known to those skilled in the art of plastic manufacturing. Cradle clips according to the present invention may also be formed by a number of other plastic molding techniques, such as, for example, casting and compression molding which are similarly familiar to persons skilled in the art. Where metal is chosen as the material of construction for a cradle clip according to the invention, those skilled in that art will recognize die casting as a preferred method to fabrication. Regardless of the method of manufacture, it is viewed as greatly preferable to produce the various embodiments of the present invention as unitary pieces, however, the elements of this invention may also be separately manufactured and assembled into a complete device by adhesives or by mechanical means which will be obvious to those knowledgeable in the art of the material of fabrication.

Cradle clip 11 is formed with a generally rectangular base 12. Right side wall 13 and left side wall 14 are shown projecting upwardly from the longitudinal edges of base 12, both in a direction generally normal to the base. Upper right arm 15 and upper left arm 16 project respectively from the upper extremities of side walls 13 and 14. Upper right arm 15 and upper left arm 16 extend with mirror symmetry diagonally downward toward base 12 and inwardly towards the centerline of base 12. Arms 15 and 16 both terminate a short distance before the centerline of base 12, thus defining therebetween gap 17 for the entry of conduits into the clip enclosure. The extremities of upper arms 15 and 16 are formed with bulb enlargements 18. A second lower set of arms, consisting of lower right arm 19 and lower left arm 20, project from side walls 13 and 14, commencing from positions on said walls somewhat below upper arms 15 and 16. Like upper arms 15 and 16, lower arms 19 and 20 extend, with mirror symmetry to one another, inwardly and downwardly towards base 12 and terminate a small distance apart, thereby defining lower interarm gap 21. Lower arms 19 and 20 also have bulb enlargements 18 on their extremities.

The size and placement of the various component parts of cradle clip 11, within the confines of the present invention, are selected so as to best suit the intended application of the cradle clip. As will be apparent from the drawings, the vertical interarm distance between the bottom surface of upper arms 15 and 16 and the top surface of lower arms 19 and 20 of cradle clip 11 should be set at something slightly less than the cross-section of the smallest conduit intended to be held thereby, in this way the upper and lower arms cooperate to impose on any conduit therebetween a centering force which serves to propel the conduit to the extremities of the arms where interarm gaps 17 and 21 afford greater space for the conduit. In the depicted embodiments of the invention, the arm pairs on the left and right side of the clip have generally parallel alignments and the vertical distance between upper and lower arms on both sides of cradle clip 11 is essentially constant over the full length of the arms. This parallel configuration for the upper and lower arm pairs is not essential to the invention and should not be taken to in anyway limit its generality. The upper and lower arm pairs of a cradle clip according to the invention may also diverge so that distance between upper right arm 15 and lower right arm 19, and between upper left arm 16 and lower left arm 20, increases as the arms pairs extend to the centerline of the clip. Where a cradle clip with diverging arm pairs as aforedescribed is employed, the smallest conduit which can be snugly held by the clip will have a cross-section slightly larger than the distance between the upper and lower arm pairs at their centermost extremities. In the drawings, cradle clip arms 15,16,19 and 20 project from side walls 13 and 14 at acute angles. For most applications of the invention, cradle clip arms 15,16, 19 and 20 will be formed at angles of between 15 and 75 degrees to side walls 13 and 14, with arm to wall angles of 30 to 60 degrees being generally preferred.

In operation cradle clip 11 is loaded by pressing a conduit of appropriate size into upper interarm gap 17, the conduit being too large to pass therethrough engages the extremities of upper arms 15 and 16 and moves them from its path by deflecting them downwardly and towards side walls 13 and 14. Once the largest cross-section of the conduit has passed between bulb enlargements 18 on the extremities of upper arm 15 and 16, arms 15 and 16 resiliently return to their normal orientation. As a conduit moves more deeply into cradle clamp 11 it eventually engages lower arms 19 and 20 and, just as in the case of upper arms 15 and 16, pushes them from its path causing them to resiliently deflect downwardly and towards the sides of the cradle clip. The extent to which lower arms 19 and 20 must be deflected on loading a conduit into cradle clip 11 depends upon the size of the conduit being inserted, as large conduits must move deeply into the clip enclosure inducing a large displacement of lower arms 19 and 20 before upper arms 15 and 16 are able to disengage from the conduit and resiliently return to their normal positions.

Once a conduit is fully inserted into cradle clip 11, it is engaged on its uppermost surface by the bulb enlargements 18 on upper arms 15 and 16 and on its innermost surface by lower arms 19 and 20. The conduit is suspended in the cradle clip by the resilient memory of the cradle clip's arms for their natural positions.

In an embodiment of the invention depicted in FIGS. 7 and 8 upper arm pair 15 and 16, or lower arm pair 19 and 20, or both arm pairs, can be formed so as to lie in different axial planes. This construction makes it possible to have an arm pair extend beyond the centerline of the clip into overlapping axial juxtaposition, which serves to close gap 17 and/or 21 in clip 11, while still enabling the arms of the clip to flex for loading and to hold large conduits, without coming into blocking alignment. The described embodiment of the invention is a particular advantage when small conduits, which might with less difficulty than desired escape cradle clip 11, are to be contained by a clip according to the invention. The loading of a cradle clip with axially overlapping arms is essentially as aforedescribed for cradle clip 11, however with such a clip it is necessary to create and then enlarge a gap between the arms of the upper arm pair by deflecting the arms downwardly and laterally, where with cradle clip 11 the gap is normally present and needs only to be enlarged.

A conduit may be removed from cradle clip 11 by pulling or pushing the conduit in an upward direction into interarm gap 17 so that the conduit, being larger in cross-section than gap 17, engages upper arms 15 and 16 and causes them to resiliently flex upwardly and away from the centerline of the clip, thereby increasing the width of interarm gap 17 to permit the passage of the conduit therethrough. Alternatively, upper arms 15 and 16 may be manually deflected in the same way, so as to permit the conduit to pass therebetween without undue stress.

Because each arm of cradle clip 11 has the ability to flex to absorb movements and vibrations of conduits contained therein and resilient forces will cause the other arms of the cradle clip to maintain touching engagement with the conduit despite its movement, cradle clip 11 is capable of firmly and snugly holding a conduit while it is undergoing significant disruptive movement. This property of cradle clip 11 makes it ideally suited for holding long rigid conduits, such as for example metal tubes. The lever forces brought to bear on the clip when a rigid conduit is manipulated can be absorbed by the clip in a dynamic fashion and will not, except for in the most extreme of circumstances, cause the conduit to slip from the cradle clip.

The dynamic flexing action of arms 15, 16, 19 and 20 also serve to enable cradle clip 11 to tolerate minor mispositioning of the clip with respect to the path of a rigid conduit being restrained thereby. In the ideal situation, cradle clip 11 will be installed so that the centerline of the clip coincides with the axis of conduit to be held by it, thus insuring that the conduit will be cradled or suspended in the center of the clip where it can be afforded the maximum latitude for disruptive movement. However, unlike other types of restraining clips, should cradle clip 11 be installed so that its centerline is displaced slightly from the axis of the conduit, the conduit will nonetheless be supported by at least two arms of cradle clip 11.

Cradle clip 11 includes a device for affixing the clip to supporting wall panels having apertures therein. It comprises a wall panel support 30 integral with a substantially perpendicular aperture stem 31 which bears extended flexible resilient wings 32 biased in the direction of wall panel support 30. In operation, as aperture stem 31 is inserted into a wall aperture of appropriate size, wings 32 fold in against aperture stem 31. Once aperture stem 31 is fully inserted, wings 32 resiliently return to their extended positions engaging the reverse side of the wall and preventing removal of the affixing device. Clip stem 33 is appended on one end to base 12 and on its other end to wall panel support 30. The length of clip stem 33, as well as its flexibility and shape, are adapted to conform to the requirements of the intended use of cradle clip 11.

Cradle clip 40, depicted in FIG. 4, is identical to cradle clip 11 in its conduit restraining elements and differs only in its incorporation of a push pin type mounting device. The push pin mounting device, which is designed for the flush mounting of cradle clip 40 to a panel, comprises conical nose 41 integral with an axially aligned aperture stem 42 which bears a plurality of frustoconical rings 43 having a normal orientation to the axis of the aperture stem. In operation, conical nose 41 is inserted into a panel aperature of appropriate size and aperture stem 42 is pushed into the panel, so that the periphery of the first frustoconical ring 43 which has a slightly larger diameter than the panel aperture engages the panel wall and flexes to pass through the panel aperature. As aperture stem 42 is inserted into the panel aperature successive frustoconical rings 43 pass through the panel aperature and once behind the panel resiliently return to their original dimensions, they thus engage the reverse side of the panel and prevent removal of the affixing device. Base 12 of cradle clip 40 is equipped with tension nubs 44, as is preferred when a push pin type mounting device is employed with a cradle clip according the present invention. Tension nubs 44 help provide cradle clip 40 with a firm grip on a wall panel when aperature stem 42 is fully inserted by enabling a tighter fit between the uppermost fustoconical ring 43 and the cradle clip base 12.

FIGS. 5-6 show a multiple conduit cradle clip 50 according to the present invention which is specially adapted to snugly hold a plurality of conduits. Cradle chip 50 includes a rectangular base 51 from the bottom side of which projects a standoff affixing device of the type already described. Clip 50 is provided with a right side wall 52 and a left side wall 53 which project generally vertically from the longitudinal edges of base 51. As with cradle clip 11, cradle clip 50 also has a spaced-apart pair of arms projecting diagonally downward and toward the centerline of the clip from both its right side wall 52 and its left side wall 53, namely- lower right arm 54, lower left arm 55, upper right arm 56 and upper left arm 57. While the orientation and operation of these arms is essentially the same as in aforedescribed cradle clip 11, each arm in cradle clip 50 is modified so as to create an expandable enclosure at the center of cradle clip 50. Lower right arm 54 has an integral claw tip 58 which extends beyond the center-line of the clip curling slightly upwardly at it furthest extremity. Lower right arm 54 also has an arcuate finger 59 which projects upwardly from the center of arm 54 and which together with claw tip 58 presents an interior face having the general shape of a circular arm. Lower left arm 55 also has an integral claw tip 60 wnich extends slightly beyond the centerline of the clip and which overlaps, in closely spaced relation, the bottom surface of right claw tip 58. Lower left arm 55, like arm 54, has an arcuate finger 61 projecting upwardly from its center. Arcuate finger 61 and claw tip 60 together serve to form an inwardly facing circular arc which complements that formed by lower right arm 54 and its appendages to form a "U" shaped enclosure. Upper right arm 56 and upper left arm 57 extend into the upper portion of the aforedescribed "U" shaped enclosure where they terminate respectively with right hand-like projection 62 and left hand-like projection 63. Hand-like projections 62 and 63 both extend from the centerline of the clip to positions which respectively over-lap the radially inner faces of arcuate fingers 59 and 61. Projections 62 and 63, in the described positions, serve to complete the "U" shaped enclosure formed by the lower arms and their appendages, thus creating in the center of clip 50 a roughly circular enclosure capable of holding a plurality of conduits. In the depicted embodiment of cradle clip 50, hand-like projection 62 has a slight cutout in the region of the center-line of cradle clip 50 and has lip 64 which overhangs, in a radially outward direction, the portion of hand-like projection 63 which is adjacent the centerline of clip 50. This cutout and lip 64 cooperate to allow upper left arm 57 and upper right arm 56 to raise in unison, when such movement is necessary to expand the enclosure of cradle clip 50 to accommodate a bundle having a larger cross-section than natural enclosure of the clip.

In operation cradle clip 50 is loaded by pressing conduits, preferably one at a time, between hand-like projections 62 and 63. Responsive to the pressure transmitted to them by projections 62 and 63, integral upper arms 56 and 57 deflect downwardly and to the sides to open a gap which is large enough for the conduits to pass. Successive conduits are loaded into cradle clip 50 in the same way. If the total cross-section of a plurality of conduits, or the individual cross-section of a single conduit, loaded into cradle clip 50 exceeds the natural dimensions of the cradle clip enclosure, arms 54, 55, 56 and 57 deflect in the fashion aforedescribed with regard to cradle clip 11 and in so doing move their respective enclosure forming appendages in a radially outward direction, thereby enlarging the clip enclosure. As the enclosure of cradle clip 50 enlarges to accommodate a larger bundle, the various overlapping appendages of the clip, namely, right arm claw tip 58 and left arm claw tip 60, left arm arcuate finger 61 and left hand-like projection 63, right arm arcuate finger 59 and right hand-like projection 62, and the centermost portion of left hand-like projection 63 and right hand lip 64, slide with respect to each other to keep the clip enclosure closed to the conduits contained therein. The free expansion of the enclosure central to cradle clip 50, responsive to the demands of the cross-section of its contents, is also aided by the flexible resilient nature of the arm appendages forming the clip enclosure which enables those appendages to slightly deform or flex where such motion is necessary to enable the expansion of the cradle clip enclosure.

Multiple conduit cradle clamp 50 enjoys all the operating and reliability advantages heretofore described for cradle clip 11.

What is claimed is:

1. A conduit restraining clip comprising: a base, two side walls projecting generally vertically from the opposite edges of the base and defining with said base a generally U-shaped enclosure, two lower arms projecting, one from each of said side walls, in the direction of the opposite wall and diagonally downward toward the base, and two upper arms projecting, one from each of said side walls, in the direction of the opposite wall and diagonally downward toward the base, each of said upper arms being spaced along its length from its lower arm counterpart which projects from the same wall, the distal ends of said upper arms extending to positions juxtaposed from and closely adjacent to each other thereby defining a gap therebetween, the distal ends of said lower arms extending to positions juxtaposed from and closely adjacent to each other thereby defining a gap therebetween, said upper arms being adapted to resiliently flex downwardly and toward the side walls of the clip to enable the passage of a conduit between said upper arms into the clip enclosure and to resiliently return to substantially their unstressed positions when the conduit has passed into the clip, said lower arms being adapted to resiliently flex downwardly and toward the side walls of the clip to enable the clip to receive a conduit and to resiliently seek their unstressed positions thereby urging a conduit within the clip toward said upper arms so that a conduit once inserted into the clip is held between said upper and lower arms which upper and lower arms are adapted to flex to absorb movements of a conduit inserted into the clip.

2. The conduit restraining clip of claim 1, further including a means for affixing said clip to another object.

3. The conduit restraining clip of claim 2, wherein each of the upper arms projecting from the side walls of the clip is generally parallel to the lower arm projecting from the same side wall of the clip.

4. The conduit restraining clip of claim 3, wherein the upper and lower arms of the clip all lie in substantially the same plane.

5. A conduit restraining clip comprising: a base, two side walls projecting generally vertically from the opposite edges of the base and defining with said base a generally U-shaped enclosure, two lower arms projecting, one from each of said side walls, in the direction of the opposite wall and diagonally downward toward the base, and two upper arms projecting, one from each of said side walls, in the direction of the opposite wall and diagonally downward toward the base, each of said upper arms being spaced along its length from its lower arm counterpart which projects from the same wall, the distal ends of said upper arms extending to positions juxtaposed from each other, said upper arms being adapted to resiliently flex downwardly and toward the side walls of the clip to enable the passage of a conduit between said upper arms into the clip enclosure and to resiliently return to substantially their unstressed positions when the conduit has passed into the clip, said lower arms being adapted to resiliently flex downwardly and toward the side walls of the clip to enable the clip to receive a conduit and to resiliently seek their unstressed positions thereby urging a conduit within the clip toward said upper arms, and further including central enclosure defining projections extending from each of its upper and lower arms, said projections having generally arcuate shapes and said projection being in radially overlapping juxtaposition with a confronting projection from the circumferentially adjacent arm of the clip, whereby the central enclosure defined by said projections may be expanded to receive contents of larger cross-section than had by the clip enclosure when unstressed without the opening thereof, by the flexing of the arms of the clip to increase the size of the central enclosure and the sliding engagement of the overlapping arm projections to maintain a substantially continuous central enclosure wall.

6. The conduit restraining clip of claim 5, further including a means for affixing said clip to another object.

7. The conduit restraining clip of claim 6, wherein each of the upper arms projecting from the side walls of the clip has a generally parallel alignment to the lower arm projecting from the same side wall of the clip.

8. The conduit restraining clip of claim 7, wherein the upper and lower arms and their central enclosure defining projections all lie in substantially the same plane.

9. A conduit restraining clip comprising: a base, two side walls projecting generally vertically from the opposite edges of the base and defining with said base a generally U-shaped enclosure, two lower arms projecting, one from each of said side walls, in the direction of the opposite wall and diagonally downward toward the base lying in different axial planes, and two upper arms projecting, one from each of said side walls, in the direction of the opposite wall and diagonally downward toward the base and lying in different axial planes, each of said upper arms being spaced along its length from its lower arm counterpart which projects from the same wall, the distal ends of said upper arms being in overlapping axial juxtaposition whereby there is no axial gap therebetween, the distal ends of said lower arms being in overlapping axial juxtaposition whereby there is no axial gap therebetween, said upper arms being adapted to resiliently flex downwardly and toward the side walls of the clip to enable the passage of a conduit between said upper arm into the clip enclosure and to resiliently return to substantially their unstressed positions when the conduit has passed into the clip enclosure, said lower arms being adapted to resiliently flex downwardly and toward the side walls of the clip to enable the clip to receive a conduit and to resiliently seek their unstressed positions thereby urging a conduit within the clip toward said upper arms.

10. The conduit restraining clip of claim 9, further including a means for affixing said clip to another object.

11. The conduit restraining clip of claim 10, wherein each of the upper arms projecting from the side walls of the clip is generally parallel to the lower arm projecting from the same side wall of the clip.

12. A conduit restraining clip comprising: a base, two side walls projecting generally vertically from the opposite edges of the base and defining with said base a generally U-shaped enclosure, two lower arms projecting, one from each of said side walls, in the direction of the opposite wall and diagonally downward toward the base, and two upper arms projecting, one from each of said side walls, in the direction of the opposite wall and diagonally downward toward the base, each of said upper arms being spaced along its length from its lower arm counterpart which projects from the same wall, one pair of either said upper or lower arms lying in different axial planes with the distal ends of said pair of arms being in overlapping axial juxtaposition whereby there is no axial gap therebetween, the other pair of either said upper or lower arms having distal ends extending to positions juxtaposed from and closely adjacent to each other thereby defining a gap therebetween, said upper arms being adapted to resiliently flex downwardly and toward the side walls of the clip to enable the passage of a conduit between said upper arms into the clip enclosure and to resiliently return to substantially their unstressed positions when the conduit has passed into the clip, said lower arms being adapted to resiliently flex downwardly and toward the side walls of the clip to enable the clip to receive a conduit and to resiliently seek their unstressed positions thereby urging a conduit within the clip toward said upper arms.

13. The conduit restraining clip of claim 12, further including a means for affixing said clip to another object.

14. The conduit restraining clip of claim 13, wherein each of the upper arms projecting from the side walls of the clip is generally parallel to the lower arm projecting from the same side wall of the clip.

* * * * *